US012773788B2

(12) United States Patent
Chavez et al.

(10) Patent No.: US 12,773,788 B2
(45) Date of Patent: Oct. 27, 2026

(54) AUTONOMOUS UNKNOWN OBJECT PICK AND PLACE

(71) Applicant: Dexterity, Inc., Redwood City, CA (US)

(72) Inventors: Kevin Jose Chavez, Redwood City, CA (US); Zhouwen Sun, San Mateo, CA (US); Rohit Arka Pidaparthi, Mountain View, CA (US); Talbot Morris-Downing, Redwood City, CA (US); Harry Zhe Su, Union City, CA (US); Ben Varkey Benjamin Pottayil, Fremont, CA (US); Samir Menon, Atherton, CA (US)

(73) Assignee: Dexterity, Inc., Redwood City, CA (US)

( * ) Notice: Subject to any disclaimer, the term of this patent is extended or adjusted under 35 U.S.C. 154(b) by 0 days.

(21) Appl. No.: 19/179,829

(22) Filed: Apr. 15, 2025

(65) Prior Publication Data

US 2026/0249474 A1 Aug. 27, 2026

Related U.S. Application Data

(63) Continuation of application No. 18/485,212, filed on Oct. 11, 2023, now Pat. No. 12,296,493, which is a (Continued)

(51) Int. Cl.

| | |
|---|---|
| ***B25J 9/16*** | (2006.01) |
| ***G06T 7/12*** | (2017.01) |

(Continued)

(52) U.S. Cl.

CPC ........... *B25J 9/1697* (2013.01); *B25J 9/1612* (2013.01); *B25J 9/1674* (2013.01); *B25J 9/1687* (2013.01);

(Continued)

(58) Field of Classification Search

CPC ...... B25J 9/1697; B25J 9/1612; B25J 9/1674; B25J 9/1687; B25J 9/1689; B25J 9/1692;

(Continued)

(56) References Cited

U.S. PATENT DOCUMENTS

| | | | |
|---|---|---|---|
| 2010/0272547 | A1 | 10/2010 | Cottone |
| 2018/0272535 | A1 | 9/2018 | Ogawa |

(Continued)

FOREIGN PATENT DOCUMENTS

| | | | |
|---|---|---|---|
| WO | 2018236753 | 12/2018 | |
| WO | 2019055848 | 3/2019 | |
| WO | WO-2024180601 A1 * | 9/2024 | .............. B25J 13/08 |

OTHER PUBLICATIONS

Machine translation of WO-2024180601-A1.*

*Primary Examiner* — Robert T Nguyen

(74) *Attorney, Agent, or Firm* — Van Pelt, Yi & James LLP

(57) ABSTRACT

A set of one or more potentially graspable features for one or more objects present in a workspace area are determined based on visual data received from a plurality of cameras. For each of at least a subset of the one or more potentially graspable features one or more corresponding grasp strategies are determined to grasp the feature with a robotic arm and end effector. A score associated with a probability of a successful grasp of a corresponding feature is determined with respect to each of a least a subset of said grasp strategies. A first feature of the one or more potentially graspable features is selected to be grasped using a selected grasp strategy based at least in part on a corresponding score associated with the selected grasp strategy with respect to the first feature. The robotic arm and the end effector are controlled to attempt to grasp the first feature using the selected grasp strategy.

20 Claims, 10 Drawing Sheets

Related U.S. Application Data continuation of application No. 16/834,115, filed on Mar. 30, 2020, now Pat. No. 11,813,758.

(60) Provisional application No. 62/829,969, filed on Apr. 5, 2019.

(51) Int. Cl.
*G06T 7/13* (2017.01)
*G06T 7/55* (2017.01)
*G06T 7/70* (2017.01)

(52) U.S. Cl.
CPC ........... *B25J 9/1689* (2013.01); *B25J 9/1692* (2013.01); *G06T 7/12* (2017.01); *G06T 7/13* (2017.01); *G06T 7/55* (2017.01); *G06T 7/70* (2017.01); *G06T 2207/10028* (2013.01)

(58) Field of Classification Search
CPC .... G06T 7/12; G06T 7/13; G06T 7/55; G06T 7/70; G06T 2207/10028
See application file for complete search history.

(56) References Cited

U.S. PATENT DOCUMENTS

| | | | | |
|---|---|---|---|---|
| 2019/0070734 | A1 | 3/2019 | Wertenberger | |
| 2019/0168397 | A1* | 6/2019 | Ikeda | B25J 9/1664 |
| 2026/0148605 | A1* | 5/2026 | Ecton | G07F 17/12 |

* cited by examiner

AUTONOMOUS UNKNOWN OBJECT PICK AND PLACE

CROSS REFERENCE TO OTHER APPLICATIONS

This application is a continuation of U.S. patent application Ser. No. 18/485,212 entitled AUTONOMOUS UNKNOWN OBJECT PICK AND PLACE filed Oct. 11, 2023, which is a continuation of U.S. patent application Ser. No. 16/834,115, now U.S. Pat. No. 11,813,758, entitled AUTONOMOUS UNKNOWN OBJECT PICK AND PLACE filed Mar. 30, 2020, which claims priority to U.S. Provisional Patent Application No. 62/829,969 entitled AUTONOMOUS UNKNOWN OBJECT PICK AND PLACE filed Apr. 5, 2019, each of which is incorporated herein by reference for all purposes.

BACKGROUND OF THE INVENTION

For years, humans have been engaged in tasks that required objects to be moved from one location to another. The throughput at which objects were moved depended on human strength, stamina, and technique. Tools and machines were introduced to help improve the throughput of moving objects, but such tools and machines were usually operated or semi-operated by a human. Autonomous robots may be used to move objects from one location to another. Autonomous robots provide significant advantages over humans, such as the ability to work 24 hours a day seven days a week without having to rest. Although autonomous robots provide advantages over human labor, the use of autonomous robots introduces new problems when trying to move objects from one location to another.

BRIEF DESCRIPTION OF THE DRAWINGS

Various embodiments of the invention are disclosed in the following detailed description and the accompanying drawings.

DETAILED DESCRIPTION

Figure 1:
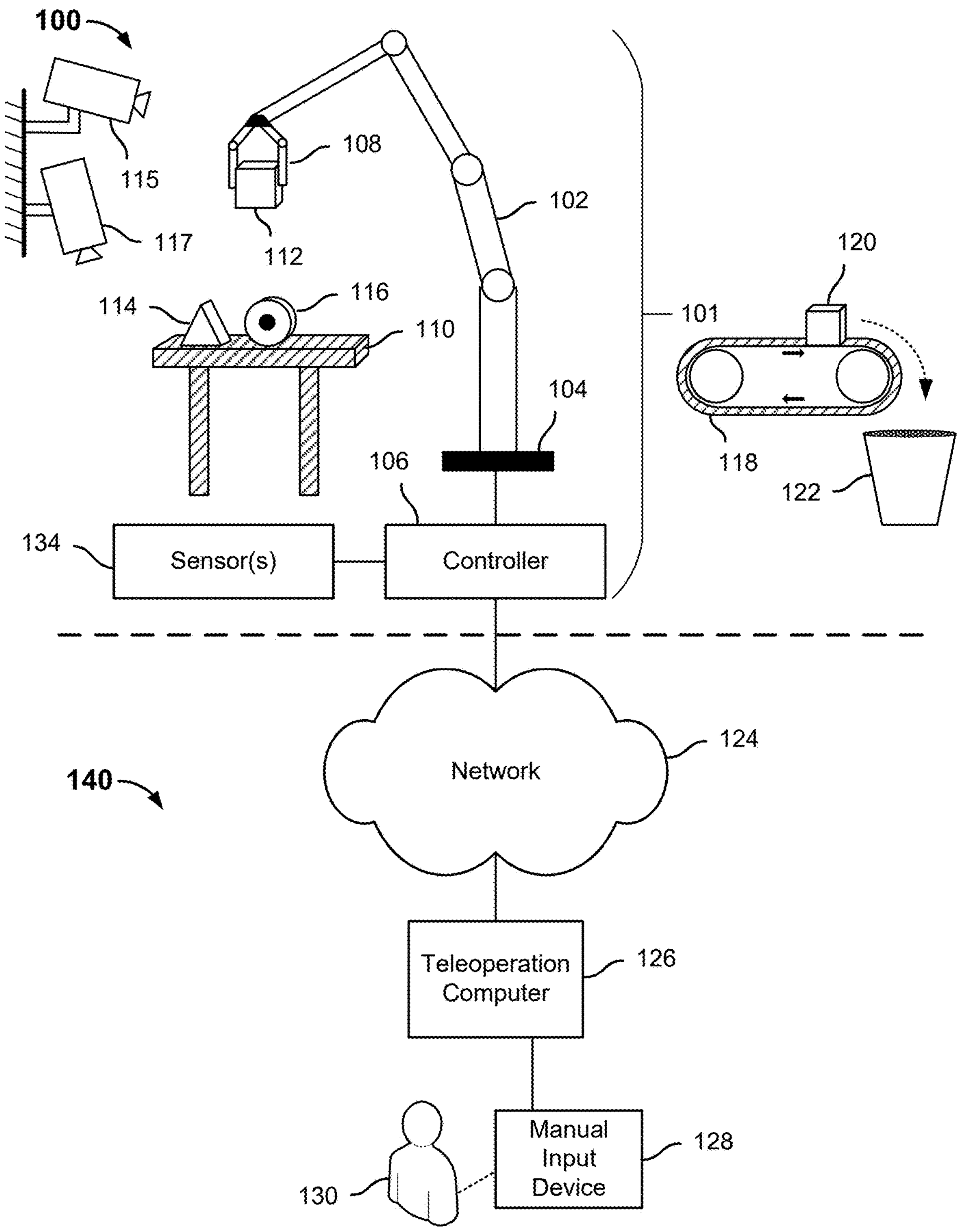
FIG. 1 is a block diagram illustrating a system for autonomously picking and placing objects in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A robotic system is tasked with autonomously picking and placing unknown objects from a first location to a second location. The robotic system may use visual data from one or more cameras to visualize the objects at the first location. However, in some cases, the objects may be piled in an arbitrary and/or cluttered manner, making it difficult or impossible to discern object boundaries and/or to obtain shape and location information for all objects in the workspace area.

In various embodiments, a robotic system as disclosed herein uses a robotic arm with an actuator at the operative end (e.g., gripper, suction, etc.) to pick up arbitrary, not previously-known objects from the first location and then place them at the second location. The throughput of the robotic system depends on the ability of the robotic system to successfully grasp an object on the first attempt and move the object to a drop off area without damaging the object in the process. However, objects may be cluttered together at the first location, making it challenging to determine object boundaries based on cameras. The robotic system may grasp an object at a wrong location causing the robotic system to drop the object, which may damage the object and/or one or more other objects at the first location.

Other systems may specifically identify all the objects (e.g., an object is a particular type of soap, an object is a particular type of stapler, etc.) located at the first location before starting the picking and placing process. However, such a process reduces the throughput of the robotic system because the computation time required to identify all the objects may take a long time to perform. Furthermore, if an object is incorrectly identified, the robotic system may restart its identification process before the picking and placing process resumes.

Techniques disclosed herein are used to increase the throughput of a robotic system that autonomously picks and places unknown objects from a first location to a second location. The robotic system is coupled to a plurality of cameras that are used to view a workspace area (e.g., the first location). One or more objects are determined to be in the workspace area. An object of the one or more objects is comprised of arbitrary color, geometry, texture, etc.

The geometry of each of the one or more objects is determined based on data of the plurality of cameras. For example, the data of the plurality of cameras may include point cloud information. Potentially graspable features (e.g., handles, protrusions, voids, etc.) are determined for each of the one or more objects in the workspace area based on the geometry of the one or more objects.

Corresponding grasp strategies are determined for each of the graspable features. For example, the robotic system may store one or more grasping techniques for features having various respective shapes and/or dimensions. In some embodiments, a feature corresponds to part of an object. In some embodiments, a feature corresponds to an entire object.

Corresponding scores of a successful grasp are determined for each of the determined grasp strategies with respect to each corresponding potentially graspable feature. One of the grasp strategies is selected based on its score and the object associated with the selected grasp strategy is attempted to be picked up. In the event the robotic system successfully grasps the object, the robotic system moves the object from the workspace area to a second location (e.g., a drop off area). In the event the robotic system fails to successfully grasp the object, the robotic system attempts an alternative grasp strategy for the object or attempts to grasp a different object. The process of picking and placing objects from the workspace area to the drop off area continues until all objects from the workspace area have been placed in the drop off area.

The robotic system is able to increase the throughput of the robotic system by associating objects with different shapes and using grasping strategies for each of the different shapes. Such a technique is adaptive for any set of objects and does not require the robotic system to be programmed for a particular set of objects prior to picking and placing the objects.

FIG. 1 is a block diagram illustrating a system for autonomously picking and placing objects in accordance with some embodiments. In the example shown, a robotic system 101 operating in environment 100. The robotic system 101 includes a plurality of jointed segments comprising a robotic arm 102 mounted on a stationary base 104, an end effector 108, one or more sensors 134, and a controller 106. The robotic arm 102 is coupled to a controller 106 configured to manipulate the robotic arm 102 and an end effector 108 mounted on a distal end of robotic arm 102. In some embodiments, controller 106 controls the robotic arm 102 and end effector 108 by providing voltages and/or other signals, inputs, etc. to motors configured at each of the respective joints between rigid elements comprising the robotic arm 102 and/or end effector 108 to cause the respective motors to apply corresponding torque(s) to cause an element coupled to a rotating element of the motor to move relative to an element to which a non-rotating element of the motor is coupled. End effector 108 may include a suction gripper, a parallel gripper, a soft gripper, a dexterous gripper, etc. Robotic system 101 may include a plurality of end effectors and select an end effector that is best suited to grasp the object. For example, an end effector may be selected based on an object's texture. Robotic system 101 may select a parallel gripper instead of a suction gripper in the event the object has too many wrinkled areas.

In the example shown in FIG. 1, the robotic arm 102 is being used to pick up objects from a table or other surface 110 (e.g., a workspace area), including in the example shown differently shaped objects 112, 114, and 116, and place them on a conveyor belt 118 (e.g., a drop off area). As shown, robotic arm 102 has previously been used to place item 120 on the conveyor belt 118, which is rotating in a direction such that the object 120 is about to fall off the conveyor belt 118 into a destination 122. A workspace area may include a moving platform, such as a conveyor belt or a rotating platform, or a stationary area, in which an pile of objects (stable or unstable) are located.

In various embodiments, the "pick and place" operation shown in FIG. 1 is performed by the robotic system 101 comprising robotic arm 102, end effector 108, and controller 106, at least in part in an autonomous mode of operation. For example, in some embodiments the controller 106 and/or one or more other control devices, such as a computer comprising a processor, a memory, and other components, is/are programmed to perform the pick and place operation illustrated in FIG. 1. For example, in some embodiments a programmer or other operator may have programmed or otherwise configured the robotic system 101 to have an awareness of its environment 100 and its position relative to the objects on table 110 (or, in some embodiments, a set of coordinates or other locations associate with the table 110, on the one hand, and the conveyor belt 118.

In some embodiments, the robotic system 101 is programmed or otherwise configured to use a library or other repository of strategies to perform the pick and place operation and/or portions thereof. For example, the robotic system 101 may be configured to use awareness of its current position and the environment 100 to position end effector 108 at a location above table 110. Computer vision or other techniques may be used to identify and select an object to pick up next, and a strategy to pick up the object may be selected autonomously, e.g., based on one or more of the object's location, shape, orientation, aspect presented, texture, rigidity, etc.

For example, in the example shown in FIG. 1, the robotic system 101 may have recognized a feature associated with object 112 as having a cube geometry and selected a grasp strategy for cube geometries prior to picking up object 112. The robot may recognize object 114 as having a pyramid geometry and select a grasp strategy for pyramid geometries. The robot may recognize object 116 as having a cylindrical geometry and select a grasp strategy for cylindrical geometries.

Environment 100 includes a plurality of cameras, such as cameras 115, 117. Although FIG. 1 depicts environment 100 having two cameras, environment 100 may include n cameras where n is a number greater than one. The plurality of cameras may be wired to or wirelessly coupled to the robotic system 101. In some embodiments, at least one of the plurality of cameras is at a fixed location. In some embodiments, at least one of the plurality of cameras is at a dynamically moving (e.g., attached to a moving object, such as a drone). In some embodiments, at least one of the plurality of cameras is capable of being stationary and moved to a different location (e.g., detect an object at a first location, move the camera to a second location, and detect the object at the second location). In some embodiments, different lighting conditions are used in environment 100 to detect changes in perceived surface features of one or more objects.

Using a plurality of cameras enables the robotic system 101 to view environment 100 from different vantage points. This prevents objects from being obscured and gives more accurate estimates of the object geometries and object boundaries. For example, a large object may be placed in such a way that it prevents a camera from seeing a smaller object next to the large object. Using a plurality of cameras from different locations enables the smaller object to be seen and boundary information associated with the smaller object to be determined. A large workspace area may not be covered by a single camera. The views associated with a plurality of cameras may be merged to give the robotic system 101 a more complete view of the workspace area 110. In the event one of the cameras is blocked, the robotic system 101 is still able to pick and place objects. The use of cameras also enables the robotic system 101 to determine, as described herein, whether or not the robotic system needs to be recalibrated. For example, ArUco markers (e.g., binary square fiducial markers) may be used to initially align the plurality of cameras.

In some embodiments, the robotic system 101 segments objects based on a point cloud generated by one or more of the plurality of cameras. Robotic system 101 can segment the objects based on the RBG or multi-spectrum camera image (e.g., a combination of RGB, Depth, and/or Infrared, etc.). The segmented objects can be deprojected into a point cloud so that potential graspable areas can be determined. This provides additional information, such as object type, expected weight/material, preferred grasp strategy, etc., that is not available when segmenting an object based on point cloud information alone. This combined segmenting strategy works well when picking objects that are difficult to distinguish with depth alone (e.g., small boxes that are tightly packed together could look like a single plane as a point cloud), but using image segmentation combined with point cloud information, robotic system 101 can identify each box and extract the box from the input.

In some embodiments, the robotic system 101 autonomously picks and places unknown objects from table 110 (e.g., a workspace area) to conveyor belt 118 (e.g., a drop off area). The robotic system 101 may determine that objects 112, 114, 116 are located on table 110 through the use of cameras 115, 117. Controller 106 determines geometry information based on visual data (e.g., point cloud data) received from cameras 115, 117. Controller 106 selects corresponding potentially graspable features for objects 112, 114, 116 that corresponds to the geometry information determined from the visual data received from cameras 115, 117. For example, based on the visual data received from cameras 115, 117, controller 106 may determine that object 112 includes a graspable feature that corresponds to a cube shape, object 114 includes a graspable feature that corresponds to a pyramid shape, and object 116 includes a cylindrical shape. Controller 106 may select a graspable feature that most closely resembles a geometric object within a threshold amount. For example, controller 106 may compare the determined geometry information with a library of known features and select a feature for the object based on the comparison. In some embodiments, the features are canonical shapes. Controller 106 may superimpose the canonical shapes on the objects to be grasped.

To determine one or more graspable features associated with an object, controller 106 may randomly cut planes of an object to decompose the object into a plurality of sub-segments. The object may be cut at planes with minimum occupancy of data points of a point cloud (related to grasping a pointy feature at the top of an object). Planes of an object may be cut based on strong gradients in color or appearance of the object. In some embodiments, a membership function is used to determine if there are outliers in a point cloud within a generic generated sub-region. An additional cutting plane may be added or the object may be split in segregate areas with high residuals. The sub-segments may be processed separately. For example, outlier detection techniques may be applied to the sub-segments. In some embodiments, a 5-sigma fits a Gaussian distribution to the points and identifies points that are 5-sigma (standard deviation) away from the mean, and marks the identified points as outliers. In some embodiments, a subsampling method is used on the point cloud and refit to a mean. The points are then used to find points that are a certain distance away from the mean.

In some embodiments, sub-segments of an object are determined based on a reach of end effector's 108 interaction with the object. For example, if end effector 108 is unable to grasp across a wide object, then controller 108 determines not to grasp the object around the wide portion of the object. If a suction gripper end effector is being used, then a relatively smooth flat surface is sought out. Void-based picking strategies or minimum occupancy cutting planes may be avoided. Primitives are re-fit to the new partitioned cloud. The process may repeat iteratively until some level of quality or recursion limit is met.

Controller 106 may determine negative space information (e.g., voids) associated with an object based on the visual data received from cameras 115, 117. For example, controller 106 may determine that a handle of a coffee mug includes negative space or that a car tire includes negative space. Computer vision algorithms using the data from the plurality of cameras may determine voids (e.g., holes) in objects, such as cups, mugs, rolled up wire, tape, etc. In the event a void is detected, an object may be grasped by inserting a gripper into the void and picking the object from a side wall of the object.

Controller 106 may determine the curvature of an object that is going to be picked based on the visual data received from cameras 115, 117. In the event controller 106 determines that the object is curved, controller 106 may change a control strategy associated with placing an object, such that the curved object is placed more carefully and more slowly ungripped to prevent the object from rolling away when placed. In the event the visual data received from cameras 115, 117 indicates that a placed object is rolling or moving after a grip of the object is initially released, controller 106 may re-grip the object and try to settle the object before the grip is released again. In the event controller 106 attempts to grip/re-grip the object more than a threshold number of times, a warning may be provided to user 130 and alert user 130 that the object may roll away.

Controller 106 determines corresponding features associated with objects 112, 114, 116 based on the visual data received from cameras 115, 117. For example, controller 106 may determine that an object includes a handle. The visual data received from cameras may be used to determine a minimum boundary associated with an object and a maximum boundary associated with the object. A boundary of the object may include a height, width, or depth associated with the object. The visual data may provide data that allows one or more of the boundaries of the object to be determined. For example, a first camera may be facing an object at a first angle. The first camera may be able to provide information regarding a height and width of the object, but is unable to provide depth information of the object. A second camera may be facing the object at a second angle. The second camera may be able to provide information regarding a depth and height of the object, but unable to provide information regarding a width of the object. Controller 106 may merge the visual data received from the plurality of cameras to determine boundary information (estimated, approximate, or exact) associated with an object. For example, controller 106 may determine the height and width of an object, but not the depth. Controller 106 may determine that the depth of the object is within a certain range of values.

A minimum boundary associated with an object corresponds to a minimum value that an object may have in a particular dimension. A maximum boundary associated with an object corresponds to a maximum value that an object may have in a particular dimension. For example, the first camera may detect a first object and a second object behind the first object. Controller 106 may determine that the second object is 12 inches behind the first object based on the visual data from the first camera. The maximum value that the first object may have in the depth dimension is 12 inches in the event the first object and the second object are touching. The minimum value that the first object may have in the depth dimension is a threshold minimum size for the dimension (e.g., ⅛ inch, ¼ inch, ½ inch, 1 inch, etc.). The threshold minimum size may be based on historically known objects, known objects with similar dimensions, context of objects, type of objects, etc.

Controller 106 is associated with a memory (not shown) that stores a data structure that associates grasping strategies with features. A grasping strategy may be comprised of a grasping technique and how to grasp a feature using the grasping technique. In some embodiments, a grasping strategy includes grasping a major and minor axes of a bounding box that can be fit to the geometric estimate of object/segment. In some embodiments, a grasping strategy includes cutting the object/segment estimate at some Z-height and recalculating a bounding box. The major and minor axes of the recalculated bounding box may then be grasped. This is useful when an object has a wide base but a small tower somewhere in the middle and the robotic system wants to accurately grasp the town. The memory also stores instructions on how to perform the grasping techniques. The instructions may include instructions to partially pre-close a gripper if required to avoid impacting other objects. The memory also stores instructions on how to perform the placing techniques. The instructions may include instructions to partially open gripper fingers of end effector 108 so that end effector 108 does not disrupt other objects while placing the object at a drop off area. The memory also stores information regarding an end effector's mechanism and geometry (e.g., parallel gripper vs suction gripper, width/length of the gripper fingers, etc.).

A grasping technique may be associated with one or more features. For example, a suction technique may be used for objects with a graspable feature that corresponds to a pyramidal shape, a graspable feature that corresponds to a cube shape, or a graspable feature that corresponds to a rectangular prism shape. A parallel gripping technique may be used for objects with a graspable feature that corresponds to a spherical shape. A feature may be associated with one or more grasping techniques. For example, a parallel gripping technique or a scooping technique may be used for a graspable feature that corresponds to a spherical shape. Different types of grippers may be used to grasp a feature having a particular shape. For example, a first grasping technique may use a parallel gripper and a second grasping technique may use a suction gripper. In some embodiments, the types of grippers are autonomously switched between gripper types during a pick and place operation. A grasping technique may be used at different portions of a feature. For example, a parallel gripping technique may be used on a top, middle, or bottom portion of a feature. Controller 106 determines corresponding scores for each of the grasping strategies associated with a feature. In some embodiments, an object is associated with a plurality of features. Controller 106 may determine one or more grasping techniques for each of the plurality of features and determine corresponding scores for the determined grasping techniques.

A score associated with a grasping strategy may be based on a probability that the grasping strategy will result in a successful grasp of the feature. The probability that the grasping strategy will result in a successful grasp of the feature may be based on one more factors, such as contextual information about the environment, historical grasp information for the environment, an angle at which a robotic arm is to grasp the feature (to avoid collision with other objects), a height at which a robotic arm is to grasp the feature (to prevent collision at the top of the gripper), grip width, orientation of surface normal at grasp points, the amount of the feature that is capable of being grasped, material properties, etc. Contextual information about the environment includes the existence of other objects near or adjacent to the object, the amount that the other objects near or adjacent to the object hinder an ability of a robotic arm to grasp the feature, whether more objects are continuously being added to a workspace area, etc. Material properties may include a center of mass of an object, a friction property of the object, color, reflectivity, etc. For example, robotic system 101 may build a large supporting surface so that a large object can be placed with stability. When robotic system 101 detects that an object could slid off a tilted placement support surface given the friction coefficients of the object and the placement support surface, robotic system 101 may be configured to only choose to pick objects with high enough coefficients of friction (e.g., to avoid sliding).

Controller 106 selects one of the grasping strategies based on the corresponding scores associated with each of the grasping strategies. The objects may be a heterogeneous collection of objects that are placed in a cluttered pile. Objects may vary in size, color, robotight, geometry, texture, stiffness, etc. Objects are individually removed from the pile. Some of the objects are at least partially occluded. All objects in the cluttered pile are unknown a priori. Controller 106 selects the grasping strategy with the highest score. In the event two or more grasping strategies have the same high score, controller 106 selects one of the grasping strategies, picks the feature associated with the grasping strategy, moves the object to a drop off area, and then selects a remaining object associated with the other grasping strategies.

Controller 106 causes end effector 108 to grasp a feature associated with an object. In the example shown, controller 106 has caused end effector 108 to grasp object 112. Controller 106 may leverage prior knowledge about the gripper mechanism and geometry to simplify the grasp prediction problem. For example, if end effector 108 will approach an object, such as object 112 from above, controller 106 analyzes the top section of a point cloud to identify graspable protrusions. In some embodiments, as the robotic system moves, cameras 115, 117 collect more data (e.g., closer, different angles, different lighting, reflectivity, etc.) and the robotic system 101 adjusts how it causes end effector 108 to grasp an object based on the new data.

Grasp points for an object may be determined using a meshified or segmented version of the object. A close approximation of the object to be grasp is built and a model matching with a library or a machine learning method is used to determine an optimal grasp location for the object. The grasp points are ranked. Controller 106 causes end effector 108 to grasp an object at one of the grasp points.

In some embodiments, pressure and/or vacuum sensors are used to detect leakiness to evaluate a grasp quality. For example, robotic system 101 may use a suction gripper as end effector 108 to pick up a teared plastic bag. Pressure/vacuum information can be used by robotic system 101 to abort picking action on these items, which may avoid damaging the suction gripper and/or contaminate the packaged goods inside these plastic bags.

End effector 108 moves an object, in this example object 112, to a drop off area, such as conveyor 118. End effector 108 places the object in the drop off area. The robotic system 101 may use the plurality of cameras to place the object at a location near where the robotic system 101 thinks the object should be placed. The robotic system 101 may lower the object at the drop of location and detect when the robot system 101 feels the force of the drop off area push back against it. When the robotic system 101 detects that the drop off area has been reached, the robotic system 101 opens end effector 108 or stops suction to place the object down gently. While opening end effector 108, the robotic system 101 may move up or down to control the placement force (sometimes opening the gripper while in contact can crush objects). This enables the robotic system 101 to stack objects or to dynamically adjust placement height when the placement surface height estimate is error prone or unknown. This also helps when other objects are in the way. In some embodiments, robotic system 101 determines whether any objects that may roll away are placed in a drop off area. In the event there are no objects that might roll away, controller 106 may control the robotic arm 102 and end effector 108 to push objects already in drop off area closer together so that space is created to place one or more other objects.

In various embodiments, the robotic system 101 comprising robotic arm 102, end effector 108, and controller 106 automatically prompts intervention by teleoperation. In some embodiments, if in the course of performing the pick and place operation shown in FIG. 1 the robotic system 101 reaches a state in which the robotic system 101 cannot determine a (next) strategy to (further) perform the operation, the robotic system 101 prompts a remote operator (in this example) to assist via teleoperation.

In the example shown, controller 106 is connected via network 124 to a teleoperation computer 126. In some embodiments, teleoperation computer 126 may be involved in operation of the robotic system 101 in the autonomous mode, e.g., by communicating high level instructions to controller 106 via network 124. In various embodiments, one or both of the controller 106 and teleoperation computer 126 may prompt an intervention by teleoperation, e.g., if the robotic system 101 reaches a state in which it does not have a strategy available to perform (complete) a next task or step in the operation.

For example, referring further to FIG. 1, if object 114 were dropped and landed on one of its flat sides, in an orientation that presented a triangular aspect to the robot, in some embodiments the robotic system 101 may not have a strategy available to pick up the object 114 and/or may have timed out or exhausted a configured number of attempts to pick up the object 114. In response, the teleoperator 130 may be prompted to intervene through teleoperation, and may use the manual input device 128 to control operation of the robot. For example, the teleoperator 130 may manipulate the robotic system 101 to pick up the object 114 and place the object on the conveyor belt 118. Or, the teleoperator may use the robotic system 101 to change the orientation of the object 114 to one in which the autonomous robotic system 101 would be expected (or be more likely) to have a strategy available to pick up the object 114.

In the example shown, teleoperation may be performed through manipulation of a manual input device 128, e.g., a haptic input device, by a human operator 130. The human operator 130 (sometimes referred to as a teleoperator) may be prompted by information displayed via a display device comprising and/or associated with the teleoperation computer 126 to begin teleoperation. Data from one or more sensors 134 may be provided to the human operator 130 via network 124 and teleoperation computer 126. In some embodiments, sensors 134 include a camera on the robot (not shown) or cameras 115, 117 and are configured to generate a video feed that is displayed to the teleoperator 130 and used to perform and/or complete performance of an operation or portion thereof via teleoperation. In various embodiments, the camera is connected with a low-latency, high throughput connection, including by way of example and without limitation one or more of analog RF based communication, WiFi, Bluetooth, and Sub GHz. In some embodiments, a mix of cameras of different types is used. For example, cameras with different communication rates, bandwidth, and/or other characteristics may be used, such as two RGB visual cameras, four depth cameras, two IR cameras, etc.

In various embodiments, teleoperation may be performed using a variety of different sensors 134. In some embodiments, these may guide the robotic system 101 in determining whether it is "stuck", and/or may simplify the teleoperation. In some embodiments, sensors help transition the teleoperation modality from direct haptic controls to increasingly abstract executive commands (such as clicking an object to pick with a mouse, or saying "open shelf" to an audio transcription device).

Examples of sensors 134 used in various embodiments include digital switches that are configured to detect interactions and specific "stuck" scenarios with the environment, and/or the presence of unknown agents in the vicinity of the robotic system 101 (or teleoperator). Further examples include force or pressure sensors on the hand or robot that determine success or failure of operations such as grasps. After some series of failures, the robotic system 101 determines it is "stuck". Another example is one or more sensors, such as position sensors on the robot joints, which may be used by the robotic system 101 to know whether the planned and/or otherwise expected movement trajectory is being followed precisely. When it is not following the expected trajectory precisely, likely it has made contact with the environment 100 and the robotic system 101 may be programmed to conclude it has gotten "stuck" and needs to invoke human intervention.

A vision system that includes the plurality of cameras is configured to keep track of each object in a workspace area through multi modal means (e.g., RGB instance tracking, RGB feature matching, RGB optical flow, point cloud matching, etc.) and utilize methods, such as Hungarian pair matching, to keep track of the objects that robotic system 101 is to pick. Robotic system 101 is configured to estimate the states of each tracked object, such as velocity, potential to fall/slide away, and trajectory of motion. Robotic system 101 may use other known information, such as current speed and size of the conveyance systems and sensors 134 to update the object states with higher accuracy. The determined object states may be used by robotic system 101 to make informed decisions about where and what objects to pick, and where/when/how to place the objects. For example, robotic system 101 may select more stable objects to pick (grasp) and possibly pick (even while moving) from an estimated object location in the future to compensate for movement time of robotic arm 102 and a velocity of a moving object. Robotic system 101 may place an object onto a moving platform drop-off area more steadily without dropping and causing the object to roll by placing the object with an initial velocity as estimated from environment 100. Robotic system 101 may also choose collision free zones to place objects in drop-off area 118. The collision zones may be determined from estimated trajectories of tracked objects. Using the data associated with the plurality of cameras, robotic system 101 is able to understand the shape of the grasped object and environment 100. This enables robotic system 101 to intelligently plan trajectories that will avoid collisions between the picked objects and environment 100.

In some embodiments, a plurality of robotic systems are working together to pick and place objects. Using a plurality of robotic systems may increase the overall throughput of the system.

Figure 2:
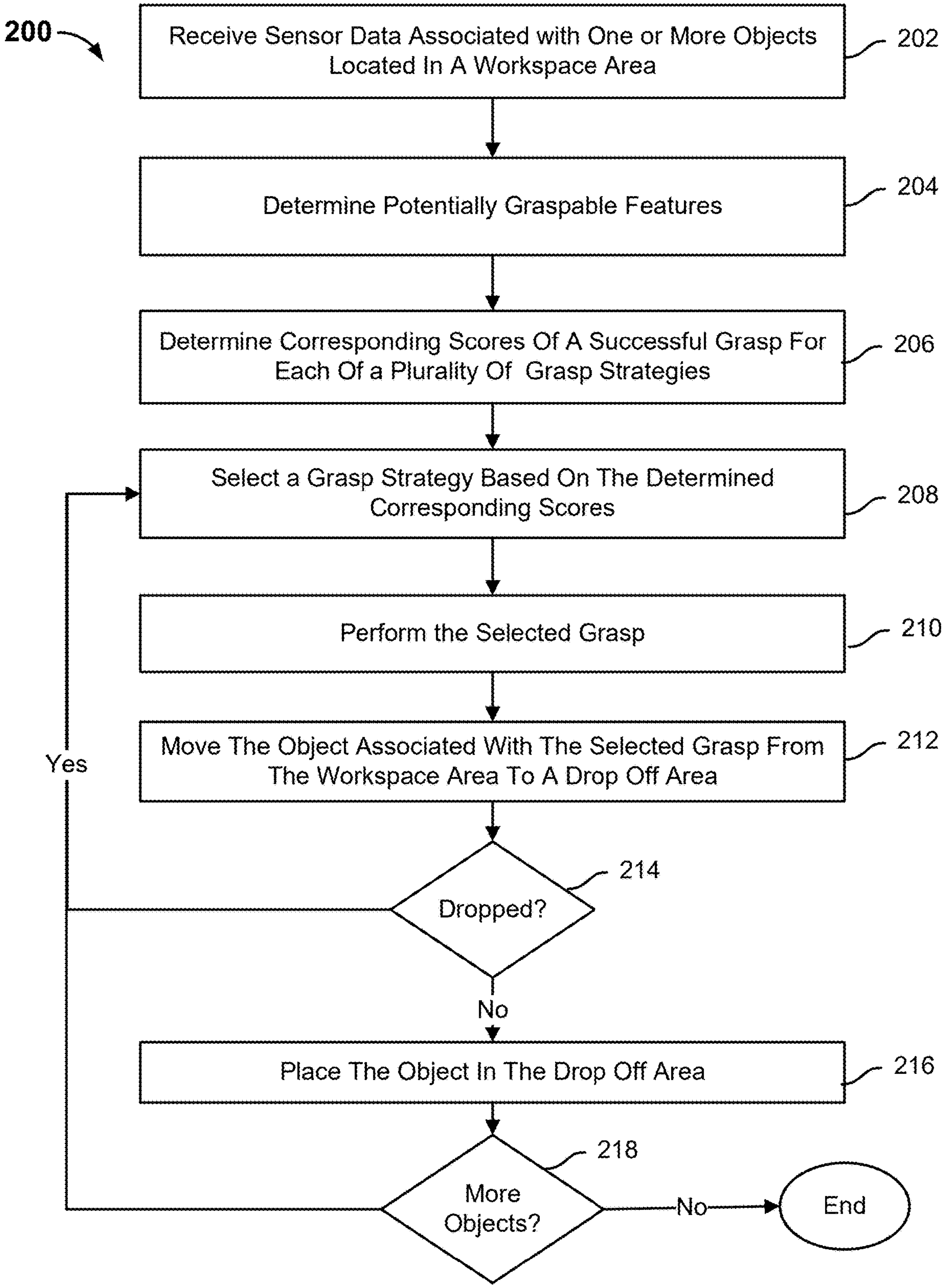
FIG. 2 is a flow chart illustrating a process for picking and placing objects in accordance with some embodiments.

FIG. 2 is a flow chart illustrating a process for picking and placing objects in accordance with some embodiments. In some embodiments, process 200 is implemented by a robotic system, such as robotic system 101.

At 202, sensor data, such as image data, associated with one or more objects located in a workspace area is received. In some embodiments, the sensor data is generated by a plurality of cameras. The plurality of cameras are configured to view and detect the one or more objects from different vantage points. In some embodiments, one or more of the cameras generate one or more point clouds of the one or more objects. In the event a plurality of point clouds are generated, the plurality of point clouds are merged together. In various embodiments, the one or more objects may include a plurality of objects placed in a cluttered pile, a plurality of objects that are spaced apart, and/or a plurality of objects one or more of which is obscured from view by one or more other objects of the plurality of objects.

Geometry information is determined for each of the plurality of objects.

Geometry information may be determined based on point cloud information obtained from data associated with one or more of the plurality of cameras.

At 204, one or more potentially graspable features are determined for the one or more objects. Corresponding geometry information associated with each of the plurality of features may be compared to a library of geometries for which grasp strategies are known. A strategy associated with a geometry that most closely resembles the geometry of a determined feature, e.g., within a similarity threshold, may be selected. In some embodiments, an object is associated with a single feature (e.g., a roll of paper towel corresponds to a cylinder). In some embodiments, an object is split into a plurality of sub-segments (also referred to as sub-objects herein) and corresponding features for each of the plurality of sub-segments are determined (e.g., a golf club includes a body segment and a head segment).

Objects that are near edges of a workspace area or corners may have physical or other limitations about where and/or how the object is to be picked. In some embodiments, a non-optimal, but feasible pick angle may be selected depending on the environment boundaries associated with an object. A wider longitudinal may be selected over a narrower latitudinal grasp because the wider longitudinal grasp may keep the end effector within the environmental bounds.

At 206, corresponding scores of a successful grasp are determined for each of the determined grasp strategies. A robotic system may be configured to use different gripping tools (e.g., suction gripper, parallel gripper, other end effector, etc.) to grasp an object or feature. The robot system may use a gripping tool to grasp an object at different locations of the object. For example, a gripping tool may be used to grasp an object at a top portion, middle portion, or bottom portion of an object. Some gripping tools may be more successful than other gripping tools when grasping certain shapes.

A score of a successful grasp of a feature may be based on a probability that the grasping strategy will result in a successful grasp. Probabilities are determined for the different combinations of gripping tools (in embodiments where multiple tools are available) and grasping locations. The probability that the grasping strategy will result in a successful grasp of the object may be based on one more factors, such as contextual information about the environment, historical grasp information for the environment, an angle at which a robotic arm is to grasp the object (to avoid collision with other objects), a height at which a robotic arm is to grasp the object (to prevent collision at the top of the gripper), grip width, orientation of surface normal at grasp points, the amount of the object that is capable of being grasped, etc. Contextual information about the environment includes the existence of other objects near or adjacent to the object, the amount that the other objects near or adjacent to the object hinder an ability of a robotic arm to grasp the object, whether more objects are continuously being added to a workspace area, etc.

At 208, one of the determined grasp strategies is selected to be attempted based on the determined corresponding scores. The objects/features and corresponding grasping strategies are ranked based on the corresponding scores. The object/feature with the highest score among the plurality of objects is selected to be grasped. In the event a plurality of potential grasps have the same score, one of the plurality of grasps is selected. After the grasped object has been moved, one of the other grasps having the same score is selected.

In the event an object from the plurality of objects has been selected, grasped, moved, and placed in a drop off area, the grasp with the next highest score is selected to be attempted.

At 210, the selected grasp is performed/attempted. Using the visual data from the plurality of cameras, the robotic system can determine if the grasped object has been moved. If not, the robotic system determines the grasp failed. In some embodiments, an end effector has a pressure sensor to determine whether the feature has been grasped. In some embodiments, the end effector senses deformation of a skin surface of the object using capacitance to determine whether the feature has been grasped. In some embodiments, the end effector is a suction gripper and the robotic system detects a suction-pressure change using a pressure sensor to determine whether or not the feature has been grasped.

In some embodiments, for thin objects or grasp features that are very close to the surface or require a pinch (e.g., a flat cloth), the robotic system may ensure that an end effector makes contact with the pick surface by sensing and controlling a particular contact force. This contact also provides the robotic system with an accurate estimate of the position of a single point on the pick surface, which can be used to refine a calibration of the robotic system.

At 212, the object associated with the selected grasp is moved from a workspace area to a drop off area. At 214, it is determined whether or not the object associated with the selected grasp has been dropped while moving the object from the workspace area to the drop off area. The object may be determined to have been dropped based on a sensor measurement (e.g., pressure, force, capacitance, etc.), of a sensor included in an end effector that the robotic system uses to determine whether or not a feature associated with an object is grasped. The sensor measurement may be compared to a threshold value to determine whether the object has been dropped.

In the event the object has been dropped, process 200 returns to 208. In the event the object has not been dropped, process 200 proceeds to 216.

At 216, the object is placed in the drop off area. Objects may be placed in a manner that prevents the end effector from colliding with boundaries associated with the drop off area. In some embodiments, the object is placed in a clutter with other objects in the drop off area. The robotic system may randomly place the object in the drop off area. The robotic system may then use a force sensor on the gripper to gently place the object on the clutter without causing the robotic system to perform a protective stop. The robotic system may add random perturbations to the drop off area within a small area to create a better distribution of objects. The robotic system may tightly pack objects into boxes in the drop off area by using the force sensor to realize a tight slotting strategy.

In some embodiments, the object is placed spaced apart from other objects in the drop off area. The robotic system may divide a placement space in the drop off area into a plurality of subareas and place the selected object in one of the subareas. There may be a buffer area between each of the subareas. In some embodiments, the buffer area is adjustable.

In some embodiments, a vision system associated with the robotic system is configured to determine how to place the object down. For example, some objects are not rigid and the extents associated with an object (e.g., a cloth or a cuddly toy) change after the object has been grasped and moved. The vision system is configured to determine what the extents are and the material information to choose how to place the object down to prevent crushing it and from dropping it from a height that might damage the object or cause the object to fall into a tangled or unfavorable configuration.

The robotic system may compare the point cloud information at various times during the grasp/pick operation. A vision system associated with the robotic system may determine an initial point cloud and as the object is grasped and moved, the differences between the initial point cloud and a current point cloud may be determined. If the determined difference indicates that the extents associated with the object change more than or equal to a threshold amount, the robotic system may determine that the object is a non-rigid object. In response to determining the object to be a non-rigid object, the robotic system may implement a different placing strategy than if the object is a rigid object. Depending a rigidify of the selected object, the object may be moved faster and a manner in which the object is placed may be dropped in a more aggressive manner to increase the pick speed/throughput of the robotic system. If the determined difference indicates that the extents associated with the object change less than a threshold amount, the robotic system may determine that the object is a rigid object. The manner in which the object is placed may be different such that the bottom surface of the object is controlled to get close to a drop-off area to prevent the object from breaking, rolling, and/or ending up in a tangled configuration.

Point cloud information of the drop off area may be used to determine where there is enough open space for the object to be placed. Point cloud information may also be used to determine where each object should be placed to maximize packing efficiency.

At 218, it is determined whether there are more objects located in the workspace area. In the event there are more objects located in the workspace area, process 200 returns to step 208. In the event there are no more objects located in the workspace area, process 200 ends.

Figure 3:
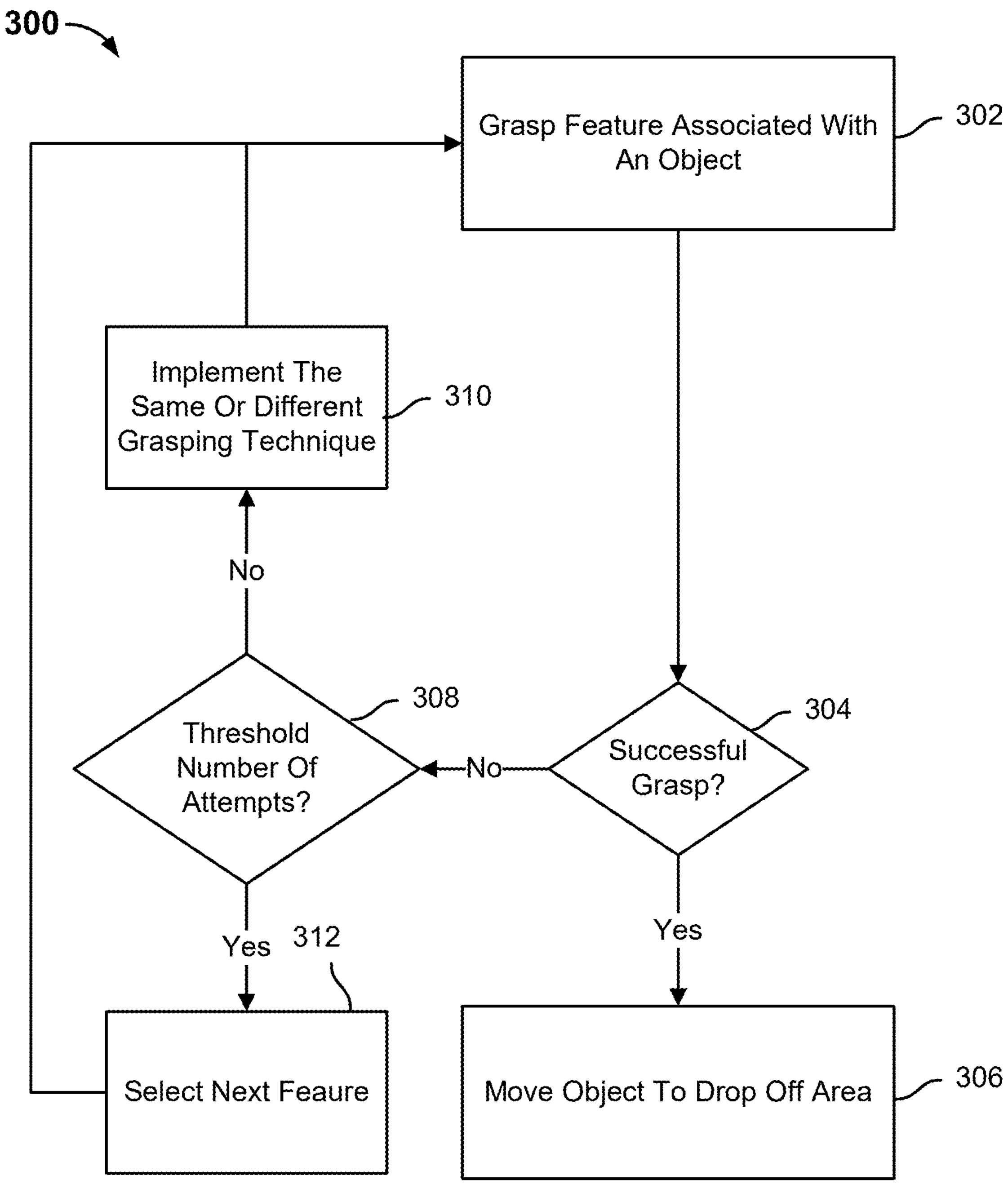
FIG. 3 is a flow chart illustrating a process for grasping and moving an object in accordance with some embodiments.

FIG. 3 is a flow chart illustrating a process for grasping and moving an object in accordance with some embodiments. In some embodiments, process 300 is implemented by a robotic system, such as robotic system 101. In some embodiments, process 300 is implemented to perform some or all of steps 210 and 212 of process 200.

At 302, a feature associated with an object is grasped. A controller of a robotic system causes an end effector to grasp a feature associated with the object. The end effector may include one or more sensors, such as a force sensor, a pressure sensor, a capacitance sensor, etc. The feature associated with the object may be grasped at a determined optimal grasp location. The optimal grasp location may be determined using a meshified or segmented version of the object that is determined from visual data received from one or more cameras of the robotic system.

In some embodiments, visual and/or tactile information is used to detect an object's texture, such as wrinkleness. A robotic system may use the visual and/or tactile information to choose high-quality pick points (e.g., probability of a successful grasp greater than a threshold), such as avoiding using a suction gripper to pick an object at a wrinkled area.

At 304, it is determined whether or not the grasp is successful. In some embodiments, the robotic system uses computer vision to determine whether the object has moved, i.e., the grasp is successful. In some embodiments, the robotic system uses a force sensor. In the event the mass detected by the force sensor increases, and this increase is different from either a static threshold or a generic estimate based on the volume/appearance of the object, the robotic system determines that the wrong object was grasped and drops the object. In some embodiments, the end effector of the robotic system has a pressure sensor or senses deformation of a skin surface of the object using capacitance to determine whether the object has been grasped. The output of the sensor is compared to a grasp threshold to determine whether the feature associated with the object has been grasped. In some embodiments, an electrical or capacitive sensor on the end effector is used to indicate complete closed contact of the end effector. This indicates that the end effector did not grasp the object. In some embodiments, the robotic system uses a suction gripper end effector to pick the object and detects a suction-pressure change using a pressure sensor. The robotic system may determine whether or not the object has been grasped based on an output of the pressure sensor. In some embodiments, the robotic system determines whether the object has been grasped based on a combination of sensors and computer vision. A voting system may be used to reduce the error rate of detection. If a majority of the detection methods determine that the object has been grasped, then the robotic system may determine that the feature associated with the object has been grasped.

In some embodiments, visual information and fingertip sensor information is combined to determine if an object slipped and moved after an initial grip of the object to ensure gentle placement. The combined information may be used to determine when an object slips during motion from pick/grasp to placement. If an object is determined to have slipped, the extents of the object may be recalculated to avoid smashing the object in a drop off area.

A geometric model of the robot and sensor state information may be used to determine a 3D configuration of the robotic arm and end effector. The point cloud or RGB pixels associated with a 3D object may be filtered out, leaving just the object that was successfully picked or nothing if the grasp failed.

In the event the grasp is successful, process 300 proceeds to 306. In the event the grasp is not successful, process 300 proceeds to 308. At 306, the object is moved to a drop off area. At 308, it is determined whether a threshold number of grasp attempts have been performed. In the event a threshold number of grasp attempts have been performed, process 300 proceeds to 312. In the event a threshold number of grasp attempts have not been performed, process 300 proceeds to 310.

At 310, the same grasping technique or a different grasping technique is implemented. A feature of an object may be associated with a plurality of grasping techniques. Each of the grasping techniques is associated with a corresponding score. The grasping technique of the plurality of grasping techniques having the highest score is initially selected. In the event that grasping technique failed, the grasping technique with the next highest score may be implemented. In some embodiments, the same grasping technique is tried again.

At 312, a next feature is selected. A plurality of objects with a plurality of features may be located in a workspace area. Each of the plurality of features have a corresponding score of a successful grasp. Features are selected based on their corresponding scores. A next feature is selected based on its corresponding score. In some embodiments, the next feature is associated with a different object. In some embodiments, the next feature is associated with the same object. The next feature has a lower score than the previous selected feature, but has the same or higher score than other remaining features of the plurality of features.

Figure 4:
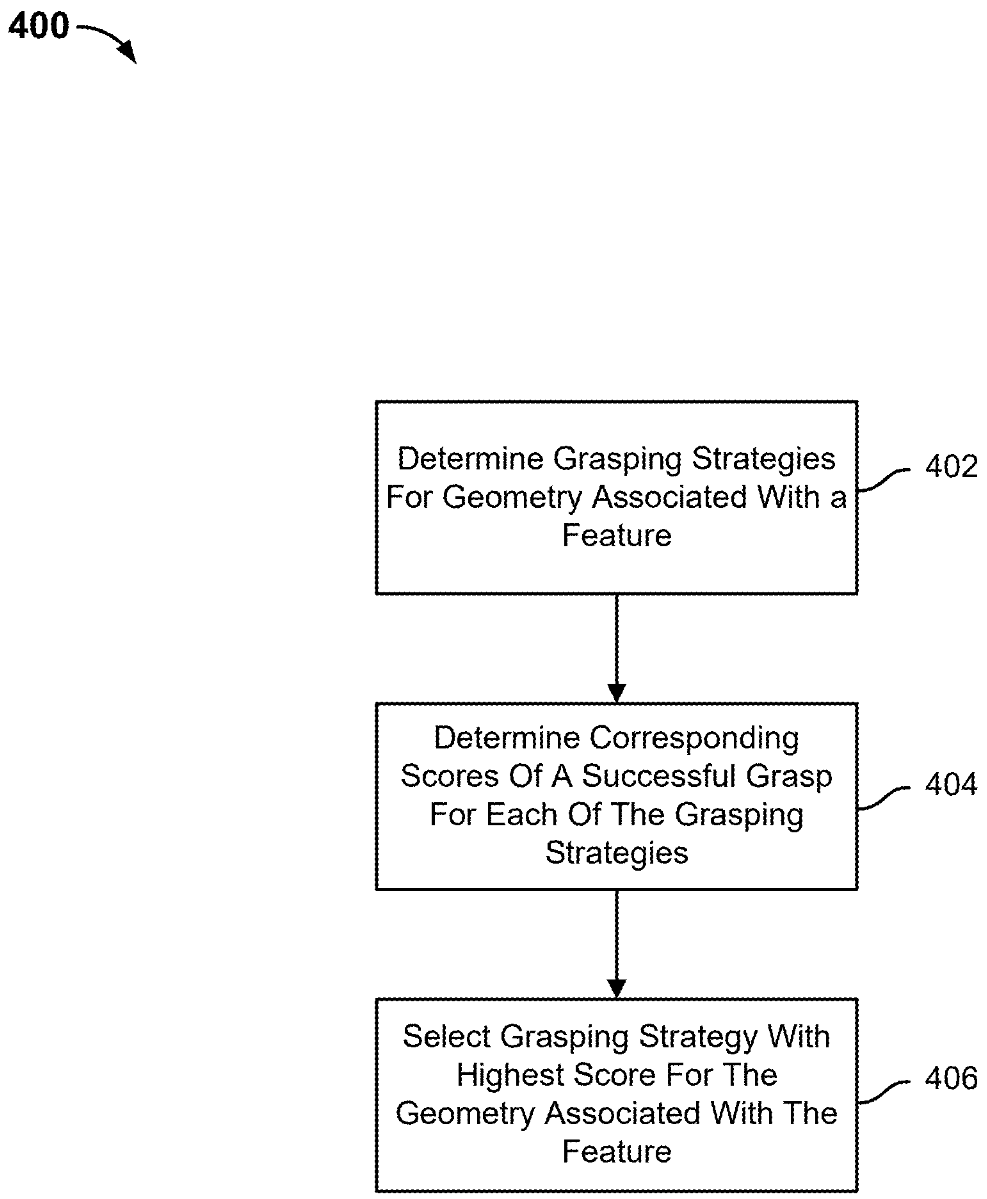
FIG. 4 is a flow chart illustrating a process for grasping a feature in accordance with some embodiments.

FIG. 4 is a flow chart illustrating a process for grasping a feature in accordance with some embodiments. In the example shown, process 400 may be implemented by a robotic system, such as robotic system 101. In some embodiments, process 400 is implemented to perform some or all of step 210 of process 200 or step 302 of process 300.

At 402, grasping strategies are determined for a geometry associated with a feature. In some embodiments, feature is associated with a determined shape. In some embodiments, an object or feature is split into a plurality of sub-segments and corresponding shapes for each of the plurality of sub-segments are determined. Grasping techniques for a feature may be different based on a geometry of the feature. For example, the grasping technique for a feature having a spherical shape may be different than the grasping technique of a feature having a rectangular prism shape.

A robotic system may store a data structure that associates features with one or more grasping strategies. For example, the data structure may include an entry that associates a first feature with a first grasping strategy and a second grasping strategy. A grasping strategy may be applied to different portions of a feature. The data structure may include entries that associates features with one or more grasping strategies and one or more portions of a feature. For example, the data structure may include a first entry that associates a first feature with a first grasping strategy at a top portion of the feature, a second entry that associates a first feature with a first grasping strategy at a middle portion of the feature, a third entry that associates a first feature with a first grasping strategy at a bottom portion of the feature, a fourth entry that associates a first feature with a second grasping strategy at a top portion of the feature, a fifth entry that associates a first feature with a second grasping strategy at a middle portion of the feature, a sixth entry that associates a first feature with a second grasping strategy at a bottom portion of the object, etc.

In some embodiments, some of the grasping strategies associated with a feature are unavailable because one or more other objects prevent an end effector from grasping the feature at a particular location. The robotic system is configured to determine the one or more available grasping strategies for the feature associated with the object based on a current placement of the one or more objects located in a workspace area (e.g., some of the grasping strategies are filtered out).

At 404, corresponding scores of successful grasp are determined for each of the grasping strategies. A score of a successful grasp of a feature may be based on a probability that the grasping strategy will result in a successful grasp of the feature. Probabilities are determined for the different combinations of gripping tools and gripping locations. The probability that the grasping strategy will result in a successful grasp of the feature may be based on one more factors, such as contextual information about the environment, historical grasp information for the environment, an angle at which a robotic arm is to grasp the feature (to avoid collision with other objects), a height at which a robotic arm is to grasp the feature (to prevent collision at the top of the gripper), grip width, orientation of surface normal at grasp points, the amount of the feature that is capable of being grasped, etc. Contextual information about the environment includes the existence of other objects near or adjacent to the object, the amount that the other objects near or adjacent to the object hinder an ability of a robotic arm to grasp the feature, whether more objects are continuously being added to a workspace, etc.

At 406, a grasping strategy with the highest score for the geometry associated with the feature is selected.

Figure 5:
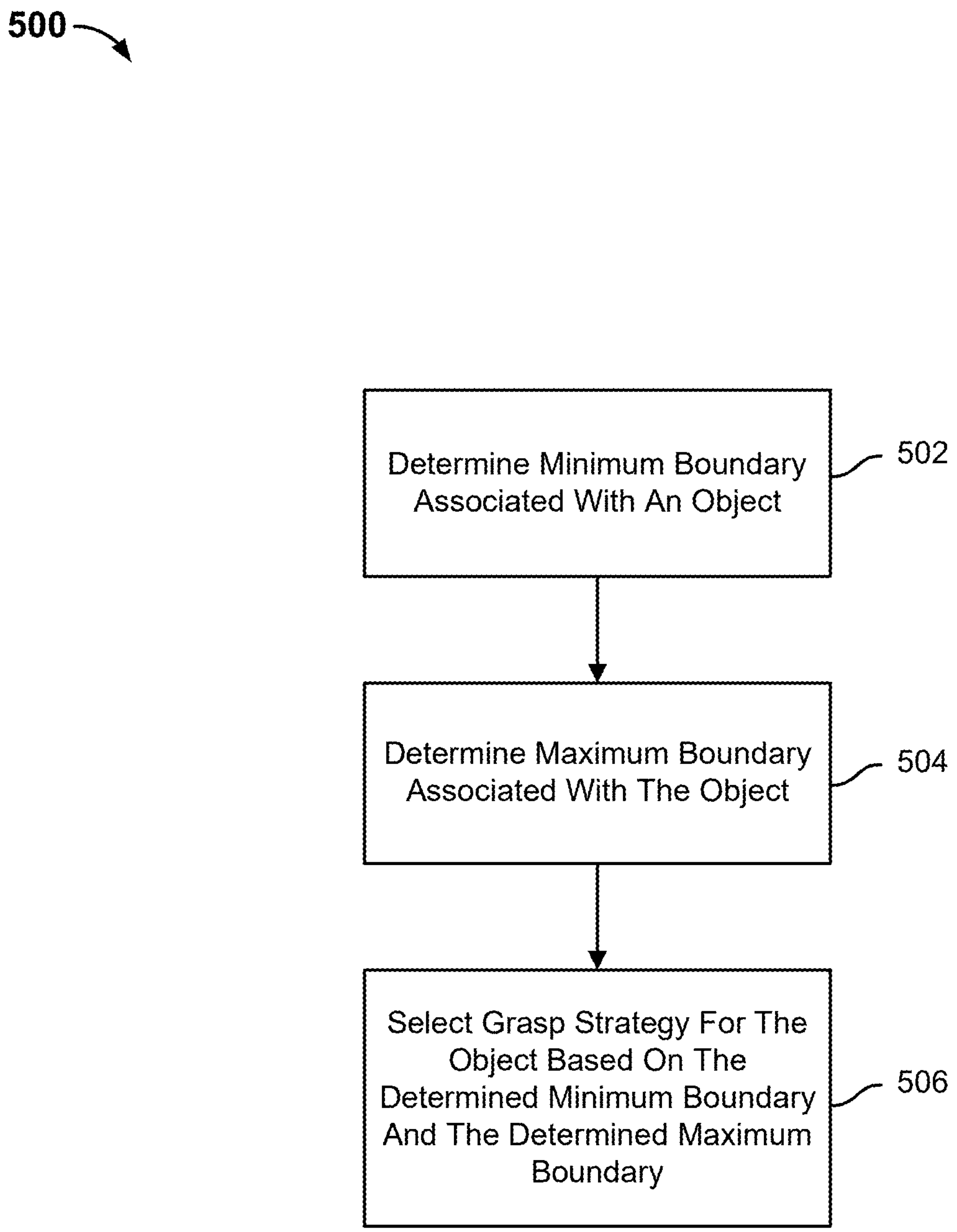
FIG. 5 is a flow chart illustrating a process for selecting a grasping technique in accordance with some embodiments.

FIG. 5 is a flow chart illustrating a process for selecting a grasping technique in accordance with some embodiments. In the example shown, process 500 may be implemented by a robotic system, such as robotic system 101. In some embodiments, process 500 is implemented to perform some of step 402 of process 400.

The visual data of one or more cameras may provide data that allows one or more of the boundaries of an object to be determined. For example, a first camera may be facing an object at a first angle. The first camera may be able to provide information regarding a height and width of the object, but is unable to provide depth information of the object. A second camera may be facing the object at a second angle. The second camera may be able to provide information regarding a depth and height of the object, but unable to provide information regarding a width of the object. The visual data received from the plurality of cameras may be merged to determine boundary information (estimated, approximate, or exact) associated with an object.

At 502, a minimum boundary associated with an object is determined. A minimum boundary of an object corresponds to a minimum value that the object may have in a particular dimension.

At 504, a maximum boundary associated with the object is determined. A maximum boundary of the object corresponds to a maximum value that the object may have in a particular dimension. A maximum boundary of the object corresponds to a maximum value that the object may have in a particular dimension.

At 506, a grasp strategy for the object is selected based on the determined minimum boundary and the determined maximum boundary. A plurality of grasp strategies may be implemented to grasp the object based on the determined minimum boundary and determined maximum boundary. For example, a feature associated with an object may be grasped along its major axis or minor axis. An end effector may be unable to grasp the feature along its major axis due to the dimensions of the end effector, but able to grasp the feature along its minor axis. In this scenario, a grasp strategy that grasps the feature along its minor axis would be selected.

Historical data may be used to select the grasp strategies. For example, the actual dimensions of previous objects with similar minimum and maximum boundaries and a corresponding grasp strategy for the previous objects may be stored in a data structure. The actual dimensions of previous objects may be determined after the robotic system moves an object to an area with a non-occluded view. In the event a grasp strategy for one of the previous objects was successful for an object with similar minimum and maximum boundaries, the successful grasp strategy may be selected for a current object with similar minimum and maximum boundaries.

Figure 6:
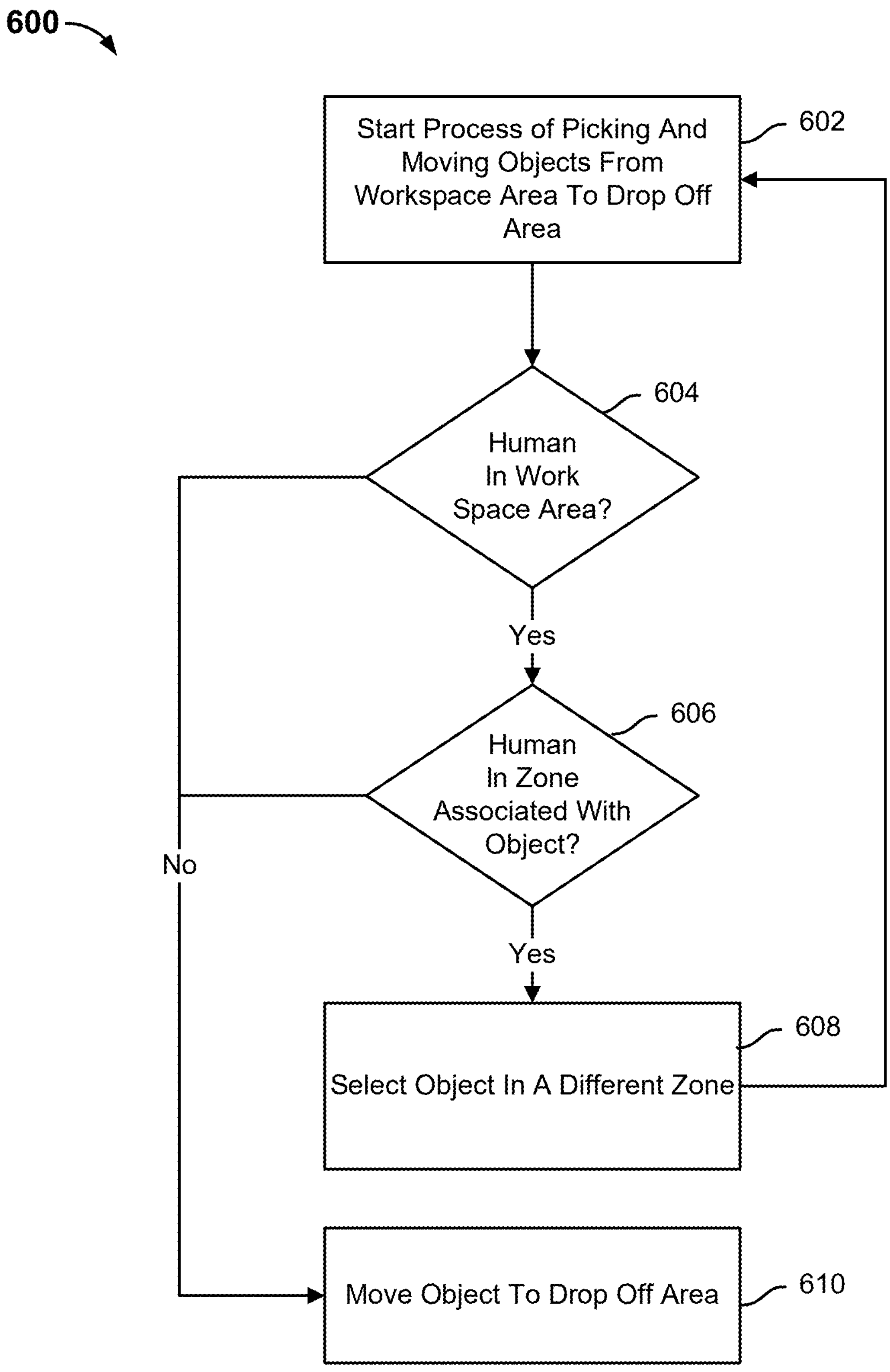
FIG. 6 is a flow chart illustrating a process for grasping and moving an object in accordance with some embodiments.

FIG. 6 is a flow chart illustrating a process for grasping and moving an object in accordance with some embodiments. In the example shown, process 600 may be implemented by a robotic system, such as robotic system 101.

Human interaction may be necessary to replenish the objects located in a workspace area or to remove objects from a drop off area. Such interaction places a human within a range of the robotic system. The control of the robotic system may detect humans entering the workspace area and react to make the conditions safe for the human.

At 602, a process of picking and moving a plurality of objects from a workspace area to a drop off area is started.

At 604, it is determined whether a human is located in the workspace area. One or more of the plurality of cameras of the robotic system may detect a human body part. In some embodiments, a human is detected using high resolution RGB images. In some embodiments, a human is sensed using IR sensors based on a human infrared signature. The data from the one or more detection sources may be used to determine a probability that the human is located in the workspace area. In the event the probability is above a detection threshold, then the human is determined to be located in the workspace area.

In the event it is determined that a human is located in the workspace area, process 600 proceeds to 606. In the event it is determined that a human is not located in the workspace area, process 600 proceeds to 610.

At 606, it is determined whether the human is located in a zone associated with the object. The workspace area may be comprised of a plurality of zones. The robotic system may be picking objects from a first zone. It is determined whether the human is located in the first zone.

In the event it is determined that the human is not located in the zone associated with the object, process 600 proceeds to 610. In the event it is determined that the human is located in the zone associated with the object, process 600 proceeds to 608.

At 608, an object in a different zone is selected. The robotic system may slow down a robotic arm in the zone associated with the object to prevent injury to the human. The robotic system may stop the robotic arm in the zone associated with the object to prevent injury to the human. After the robotic system has slowed down or stopped the robotic are, the robotic system may change the trajectory of the robotic arm to a different zone such that the trajectory of the robotic arm avoids the human. The robotic system may sound an alarm (audible and/or visual) after the human is detected to alert the human.

At 610, the object is moved to a drop off area.

Figure 7:
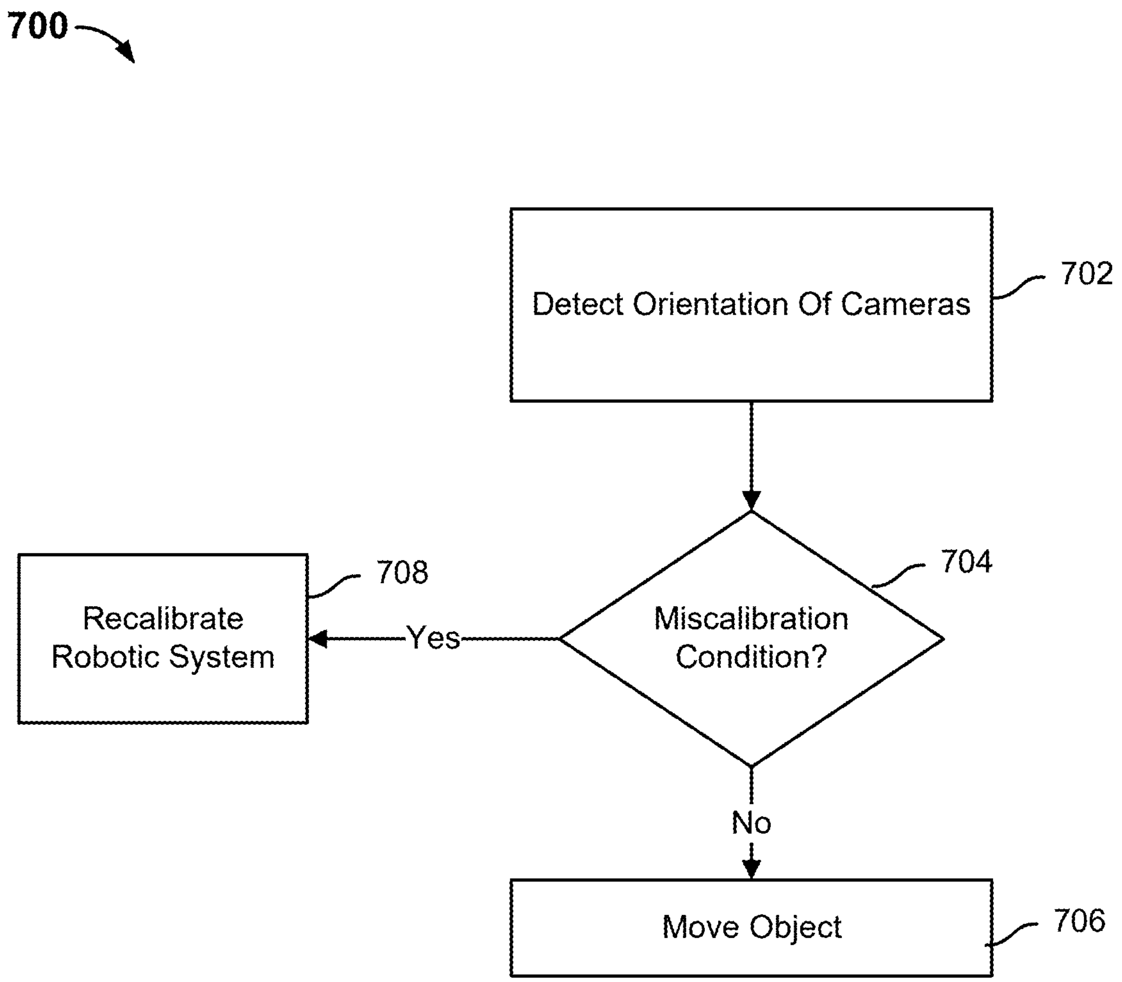
FIG. 7 is a flow chart illustrating a process for moving an object in accordance with some embodiments.

FIG. 7 is a flow chart illustrating a process for moving an object in accordance with some embodiments. In the example shown, process 700 may be implemented by a robotic system, such as robotic system 101. In some embodiments, process 700 is implemented to perform some of step 304 of process 300.

A human operator or other object may bump a camera of the robotic system or a robot stand, which may cause the robotic system to be miscalibrated. Multiple fiducial markers on a robotic system, in conjunction with additional information (e.g., depth or point cloud data) can be used to continuously co-localize stationary cameras, workspace, and robotic systems as one or more robotic systems perform their normal operations. Such continuous co-localization can also be performed using any combination of stationary/moving markers and/or stationary/moving cameras. In some embodiments, continuous co-localization is performed without using fiducial markers and using information from the normal scene. Continuous co-localization enables detection and correction of such failures, such as camera misplacement, sensor drifts, workspace rearrangement, etc. This calibration methodology enables hot-swapping, adding, or removing of cameras during normal operation.

At 702, an orientation of the cameras is detected. Aruco markers may be used to align the plurality of cameras of the robotic system. Before time the robotic system is to grasp a feature associated with an object, an alignment of the robotic system may be checked. The orientation of the cameras is detected and compared to the initial alignment of the cameras.

At 704, it is determined whether any miscalibration conditions have been satisfied. In some embodiments, a miscalibration condition occurs in the event the plurality of cameras detect that the robot base position has moved from the calibrated robot base position. In some embodiments, a miscalibration condition occurs in the event a hand camera of the plurality of cameras detects that one or more of the cameras and/or one or more of the camera stands have moved. In some embodiments, a miscalibration condition occurs in the event a robotic arm is unable to grasp a feature associated with an object after a threshold number of attempts.

In the event any of the miscalibration conditions have been satisfied, process 700 proceeds to 708. In the event any of the miscalibration conditions have not been satisfied, process 700 proceeds to 706.

At 706, the object is moved to a drop off area.

At 708, the robotic system is recalibrated. In some embodiments, the robotic system is recalibrated using a hand camera of the plurality of cameras to relocate the workspace aruco markers. In some embodiments, the robotic system is recalibrated by re-estimating using a camera-to-workspace transformation using fiducial markers (e.g., Aruco). In some embodiments, the robotic system is recalibrated to a marker on the robot. In some embodiments, the robotic system is recalibrated using an iterative closest point (ICP) algorithm, using previous calibration parameters as a seed transformation. In some embodiments, the robotic system is recalibrated using hand-eye.

Figure 8:
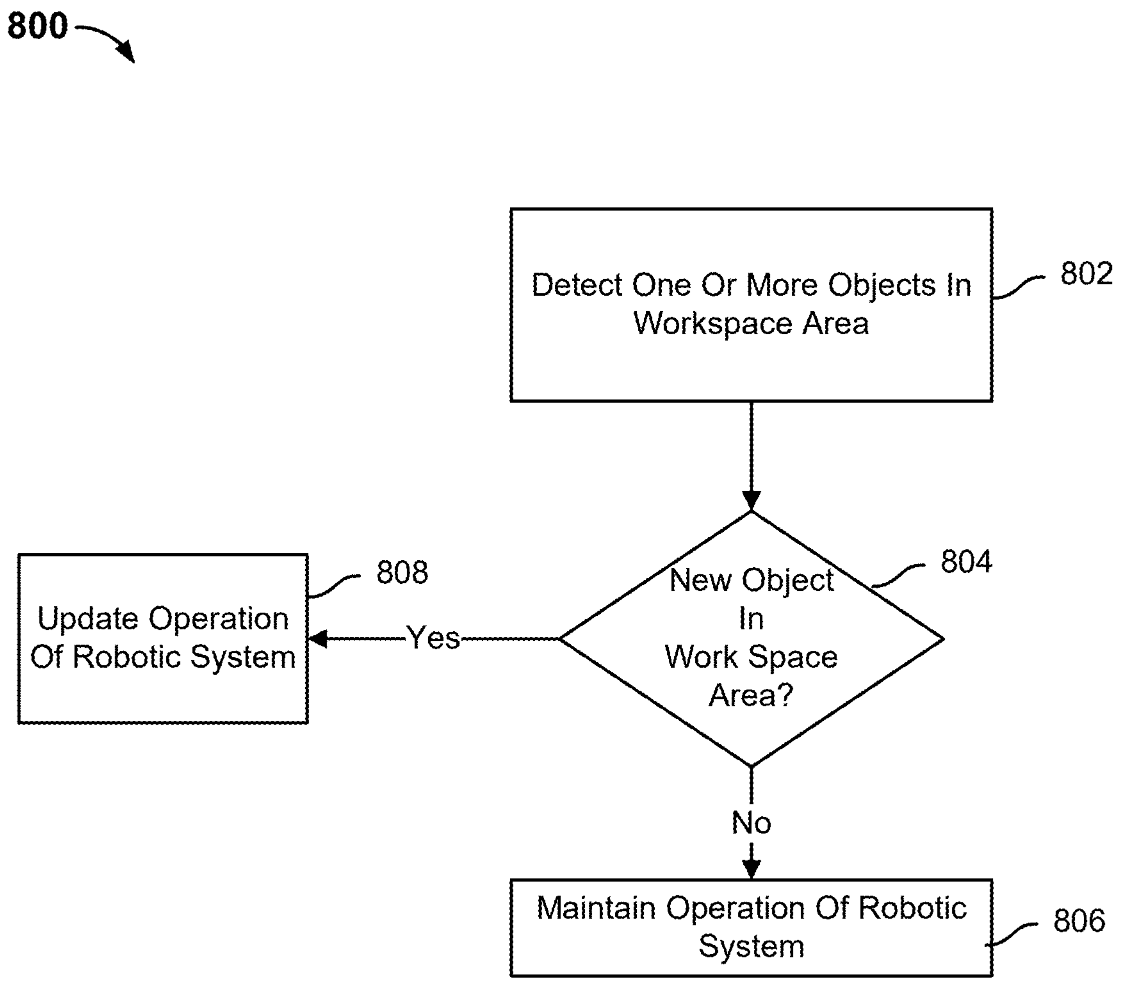
FIG. 8 is a flow chart illustrating a process for updating an operation of a robotic system in accordance with some embodiments.

FIG. 8 is a flow chart illustrating a process for updating an operation of a robotic system in accordance with some embodiments. In the example shown, process 800 may be implemented by a robotic system, such as robotic system 101.

At 802, one or more objects are detected in a workspace area. At 804, it is determined whether one of the one or more detected objects is a new object in the workspace area. In the event one of the one or more detected objects is not a new object in the workspace area, process 800 proceeds to 806. In the event one of the one or more detected objects is a new object in the workspace, process 800 proceeds to 808. At 806, operation of the robotic system is maintained according to a current configuration. At 808, an operation of the robotic system is updated. In some embodiments, a scene of the workspace area is recomputed to include the new object. In some embodiments, the scene is recomputed when the new object is a human. In some embodiments, a scene of the workspace area is recomputed when anything changes with one or more existing objects and the new object.

Figure 9:
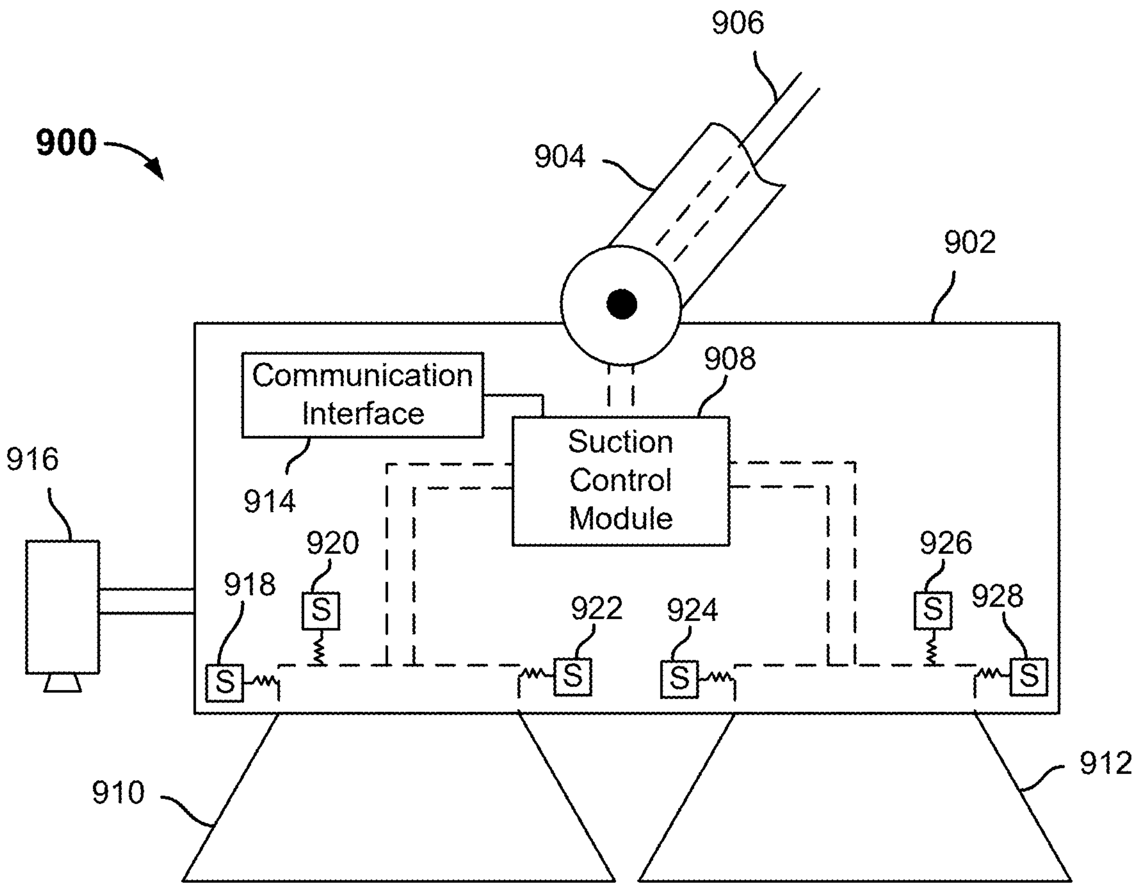
FIG. 9 is a block diagram illustrating a suction-based end effector in accordance with some embodiments.

FIG. 9 is a block diagram illustrating a suction-based end effector in accordance with some embodiments. In various embodiments, robotic arm end effector 900 of FIG. 9 may be used to implement end effector 108 of FIG. 1.

In the example shown, end effector 900 includes a body or housing 902 attached to robotic arm 904 via a rotatable coupling. In some embodiments, the connection between housing 902 and robotic arm 904 may comprise a motorized joint controlled by a control computer, such as controller 106 of FIG. 1. End effector 900 further includes a suction or other pneumatic line 906 that runs through the robotic arm 904 into the housing 902 to supply a vacuum source to suction control module 908. In various embodiments, control module 908 is connected, e.g., via wireless and/or wired communication through communication interface 914 to a control computer external to end effector 900, e.g., controller 106 of FIG. 1. The control module 908 includes electronic and/or electro-mechanical elements operable to supply suction force to suction cups 910, 912 comprising the end effector 900, e.g., to attach the end effector through suction to an item to be picked up, moved, and placed using end effector 900.

In the example shown, a camera 916 mounted on the side of housing 902 provides image data of a field of view below the end effector 900. A plurality of force sensors 918, 920, 922, 924, 926, and 928 measure force applied to the suction cups 910 and 912, respectively. In various embodiments, the force measurements are communicated via communication interface 914 to an external and/or remote control computer. The sensor readings are used in various embodiments to enable the robotic arm 904 and end effector 900 to be used to snug an item into place adjacent to other items and/or sidewalls or other structures, and/or to detect instability (e.g., insufficient push back with the item is pressed down upon while still under suction but in the place in which the item was expected to be placed and to be stable). In various embodiments, the horizontally mounted pairs of force sensors (e.g., 918 and 922, 924 and 928) are placed at right angles in the x-y plane, to enable force to be determined in all horizontal directions.

Figure 10:
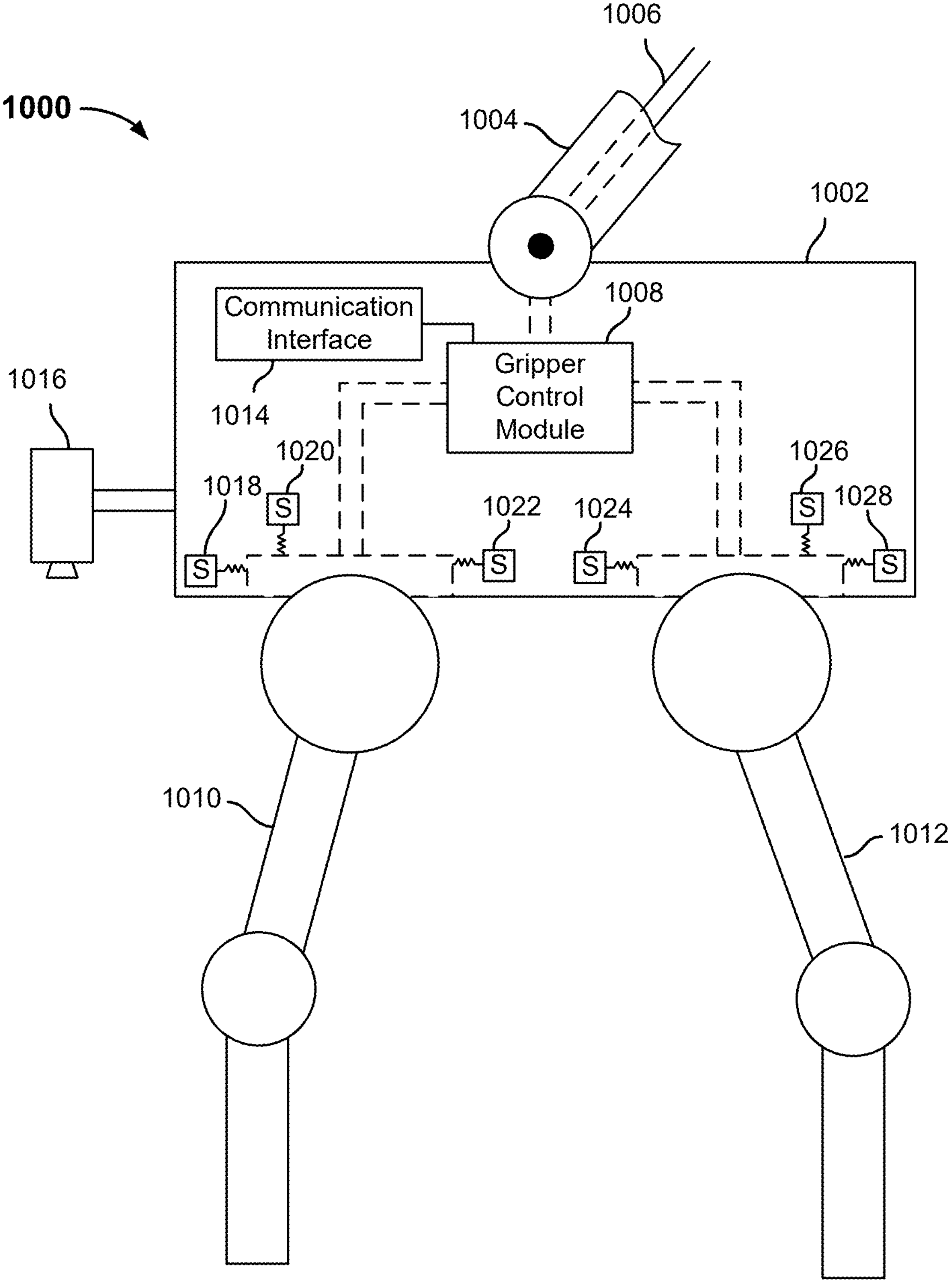
FIG. 10 is a block diagram illustrating a gripper-style end effector in accordance with some embodiments.

FIG. 10 is a block diagram illustrating a gripper-style end effector in accordance with some embodiments. In various embodiments, robotic arm end effector 1000 of FIG. 10 may be used to implement end effector 108 of FIG. 1.

In the example shown, end effector 1000 includes a body or housing 1002 attached to robotic arm 1004 via a rotatable coupling. In some embodiments, the connection between housing 1002 and robotic arm 1004 may comprise a motorized joint controlled by a control computer, such as controller 106 of FIG. 1. End effector 1000 further includes a gripper comprising articulating digits 1010 and 1012 and a power line 1006 that runs through the robotic arm 1004 into the housing 1002 to supply electrical power to gripper control module 1008. In various embodiments, control module 1008 is connected, e.g., via wireless and/or wired communication through communication interface 1014 to a control computer external to end effector 1000, e.g., controller 106 of FIG. 1. The control module 1008 includes electronic and/or electro-mechanical elements operable to manipulate the gripper digits 1010, 1012, e.g., to grasp an item to be picked up, moved, and placed using end effector 1000.

In the example shown, a camera 1016 mounted on the side of housing 1002 provides image data of a field of view below the end effector 1000. A plurality of force sensors 1018, 1020, 1022, 1024, 1026, and 1028 measure force applied to the mount points of digits 1010 and 1012, respectively. In various embodiments, the force measurements are communicated via communication interface 1014 to an external and/or remote control computer. The sensor readings are used in various embodiments to enable the robotic arm 1004 and end effector 1000 to be used to snug an item into place adjacent to other items and/or sidewalls or other structures, and/or to detect instability (e.g., insufficient push back with the item is pressed down upon while still under suction but in the place in which the item was expected to be placed and to be stable).

While a suction-type effector is shown in FIG. 9 and a gripper-type effector is shown in FIG. 10, in various embodiments one or more other and/or different types of end effector may be used in a robotic system to pick and place unknown objects, as disclosed herein.

In some embodiments, sensors are used to detect collisions with other items, the receptacle, and/or the environment, and to continue automated operation by "compliant" adjustment of the trajectory. For example, if a wall or other structure is bumped into, in some embodiments, the robotic arm reduces force and adjusts the trajectory to follow along the obstacle until it is clear of it.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

determining a first extent associated with an object prior to grasping the object;

while moving the object toward a drop-off area after grasping the object, determining a second extent associated with the object;

comparing the first extent and the second extent;

determining a placement operation for placing the object in the drop-off area based on the comparison; and placing the object in the drop-off area using the determined placement operation.

2. The method of claim 1, wherein the first extent is determined based on first point cloud information associated with the object.

3. The method of claim 2, wherein the second extent is determined based on second point cloud information associated with the object while the object is being moved toward the drop-off area.

4. The method of claim 3, wherein the object is determined to be non-rigid when a difference between the first extent and the second extent exceeds a threshold amount.

5. The method of claim 4, wherein determining the placement operation comprises reducing a height from which the object is released into the drop-off area when the object is determined to be non-rigid.

6. The method of claim 4, wherein determining the placement operation comprises reducing a placement velocity when the object is determined to be non-rigid.

7. The method of claim 4, wherein determining the placement operation comprises controlling a bottom surface of the object to move closer to the drop-off area prior to releasing the object.

8. The method of claim 3, wherein the object is determined to be rigid when a difference between the first extent and the second extent is less than a threshold amount.

9. The method of claim 8, wherein determining the placement operation comprises increasing a speed at which the object is moved toward the drop-off area.

10. The method of claim 8, wherein determining the placement operation comprises placing the object in the drop-off area using a higher placement velocity than when the object is determined to be non-rigid.

11. The method of claim 1, wherein the placement operation is selected to prevent damage to the object.

12. The method of claim 1, wherein the placement operation is selected to prevent the object from becoming tangled.

13. The method of claim 1, wherein determining the placement operation comprises controlling a bottom surface of the object to move closer to the drop-off area prior to releasing the object.

14. The method of claim 1, wherein the first extent and the second extent are determined using visual data received from a plurality of cameras.

15. A computer program product embodied in a non-transitory computer readable medium and comprising computer instructions for:

determining a first extent associated with an object prior to grasping the object;

while moving the object toward a drop-off area after grasping the object, determining a second extent associated with the object;

comparing the first extent and the second extent;

determining a placement operation for placing the object in the drop-off area based on the comparison; and placing the object in the drop-off area using the determined placement operation.

16. A system, comprising:

a processor configured to:

determine a first extent associated with an object prior to grasping the object;

while moving the object toward a drop-off area after grasping the object, determine a second extent associated with the object;

compare the first extent and the second extent;

determine a placement operation for placing the object in the drop-off area based on the comparison; and place the object in the drop-off area using the determined placement operation; and a memory coupled to the processor and configured to provide the processor with instructions.

17. The system of claim 16, wherein the first extent is determined based on first point cloud information associated with the object.

18. The system of claim 17, wherein the second extent is determined based on second point cloud information associated with the object while the object is being moved toward the drop-off area.

19. The system of claim 18, wherein the object is determined to be non-rigid when a difference between the first extent and the second extent exceeds a threshold amount.

20. The system of claim 18, wherein the object is determined to be rigid when a difference between the first extent and the second extent is less than a threshold amount.

* * * * *